United States Patent
Thirion De Briel et al.

[11] Patent Number: 5,803,223
[45] Date of Patent: Sep. 8, 1998

[54] FRICTION CLUTCH WITH A DEVICE FOR TAKING UP WEAR, ESPECIALLY FOR A MOTOR VEHICLE

[75] Inventors: Jacques Thirion De Briel, Levallois-Perret; Michel Blard, Issy-les-Moulineaux, both of France

[73] Assignee: Valeo, Paris, France

[21] Appl. No.: 793,116

[22] PCT Filed: Jun. 19, 1996

[86] PCT No.: PCT/FR95/00951

§ 371 Date: Feb. 19, 1997

§ 102(e) Date: Feb. 19, 1997

[87] PCT Pub. No.: WO97/01043

PCT Pub. Date: Jan. 9, 1997

[30] Foreign Application Priority Data

Jun. 22, 1995 [FR] France ................................. 95 07502

[51] Int. Cl.⁶ ............................................. F16D 13/75
[52] U.S. Cl. ............................... 192/70.25; 192/111 A
[58] Field of Search .......................... 192/70.25, 111 A

[56] References Cited

U.S. PATENT DOCUMENTS

| | | | |
|---|---|---|---|
| 5,409,091 | 4/1995 | Reik et al. | 192/70.25 |
| 5,568,852 | 10/1996 | Tomiyama | 192/70.25 |
| 5,595,275 | 1/1997 | Gochenour et al. | 192/111 A |
| 5,690,203 | 11/1997 | Link et al. | 192/70.25 |

FOREIGN PATENT DOCUMENTS

| | | |
|---|---|---|
| 2693522 | 1/1994 | France . |
| 2722852 | 1/1996 | France . |
| 4342390 | 6/1994 | Germany . |
| 4337613 | 5/1995 | Germany . |
| 2022729 | 12/1979 | United Kingdom . |

*Primary Examiner*—Richard M. Lorence
*Attorney, Agent, or Firm*—Longacre & White

[57] ABSTRACT

The friction clutch comprises a pressure plate (120) consisting of two half plates (120A, 120B), which are displaceable axially with respect to each other under the action of a device (111) for taking up clearance due to wear, in which this device includes at least one pair of complementary ramps (190, 191), an arming piece (101) which is mounted for rotation, with respect to a ramp (190) called an adjusting ramp, between two positions, one of which corresponds to a state of wear in the friction liners (130), with a resilient arming device biassing the arming piece (101) towards the said position, a first locking device (112), adapted to immobilise the arming piece (101) against rotation with respect to the pressure plate (120), being able to be made inoperative under the action of a second locking device (212) which is adapted to immobilise the said adjusting ramp (190) against rotation with respect to tie pressure plate (120), and being able to be made inoperative under the action of the trigger member (103), which is so arranged that the first locking device (112) and second locking device (212) are made operative in succession during successive operations of disengaging and engaging the clutch.

8 Claims, 3 Drawing Sheets

FRICTION CLUTCH WITH A DEVICE FOR TAKING UP WEAR, ESPECIALLY FOR A MOTOR VEHICLE

The present invention relates to a friction clutch, especially for a motor vehicle, and more particularly it relates to a clutch which is equipped with a device for taking up clearance due to wear in the friction liners, the said device operating continuously as wear takes place in the said liners.

A conventional friction clutch generally includes a reaction plate, which may be in two parts so as to constitute a damped flywheel, and which is mounted on a first shaft for rotation with the first shaft, which is typically a driving shaft such as the crankshaft of the internal combustion engine, the reaction plate supporting by its outer periphery a cover plate to which at least one pressure plate is attached.

The pressure plate is fixed to the cover plate and reaction plate for rotation with them, while being able to be displaced axially under the action of controlled, axially acting resilient means which generally consist of a metallic diaphragm that bears on the cover plate, while a friction disc, which carries friction liners at its outer periphery, and which is fixed to a shaft for rotation therewith, this shaft typically being a driven shaft such as the input shaft of the gearbox, is interposed between the pressure plate and the reaction plate in such a way as to be gripped between them when the clutch is in its engaged position. The diaphragm controls the axial displacement of the pressure plate when it is actuated by a clutch release bearing.

During the working life of such a clutch, the friction liners, and also, though to a lesser extent, the reaction elements consisting of the pressure plate and reaction plate, become worn, which gives rise to variation in the gripping force between the friction disc on the one hand and the pressure and reaction plates on the other hand, by virtue of the modifications to the working conditions of the diaphragm. The clutch travel also varies, as does the force necessary for declutching. By giving such a clutch a device for taking up the clearance which is due to wear in the liners, these drawbacks are avoided.

It is known from the document U.S. Pat. No. 4,207,972 to provide a device for taking up clearance in which a first plate, in this case the pressure plate, is in two coaxial parts, one of which is displaceable axially with respect to the other, in such a way that the overall thickness of the first plate is increased to the extent that the thickness of the friction liners is reduced.

In that document, the two coaxial parts of the first plate are dispaceable axially, one with respect to the other, by means of a device for taking up clearance due principally to wear in the friction liners, and this device comprises ramp means carried in a complementary manner by the two coaxial parts, which are in addition displaceable in rotation with respect to each other. The coaxial parts are put into relative rotary movement under the control of a triggering device responsive to the state of wear in the friction liners.

Such a device enables the clearance due to wear in the friction liners to be effectively taken up continuously. However, under severe working conditions, the pressure plate becomes heated, as do the remainder of the components of the clutch, so that a singular point is passed through, with clearance being taken up, and with the pressure plate adopting a conical form.

In order to overcome this disadvantage, it has been proposed in French patent application FR-A-2 722 852, filed on 21 Jul. 1994 under the number 94 09274, to provide a friction clutch, especially for a motor vehicle, of the kind comprising:

- a reaction plate adapted to be mounted on a driving shaft for rotation with the latter;
- a friction disc carrying friction liners at its outer periphery and adapted to be mounted on a driven shaft for rotation with the latter;
- a pressure plate;
- a cover plate fixed on the reaction plate, axially acting resilient means acting between the cover plate and the pressure plate, the pressure plate being rotatable with the cover plate while being displaceable axially with respect thereto;
- a first plate, which is one of the two plates comprising the reaction plate and pressure plate, consisting of two half plates, namely an outer half plate and an inner half plate, the inner half plate being the one which faces towards a friction liner and which is adapted to cooperate with the latter;
- the two half plates being rotatable with the driving shaft but being displaceable axially with respect to each other under the action of a device for taking up clearance due to wear in the liners;
- which device for taking up clearance comprises at least one pair of complementary ramps which are disposed circumferentially and each of which is associated with a respective one of the two half plates, one of the ramps, namely an application ramp, being fixed to one of the half plates for rotation therewith, the other ramp, namely an adjusting ramp, being adapted to be displaced circumferentially with respect to the engagement ramp and therefore with respect to both half plates;
- an arming piece which is mounted for rotation with respect to the said adjusting ramp through a predetermined angle which is defined by loose coupling means, between two positions, one of which corresponds to the new state of the friction liners, the other one corresponding to a state of wear in the friction liners, with circumferentially acting resilient arming means biassing the arming piece towards the said other position, and with circumferentially acting resilient triggering means being disposed between the arming piece and the adjusting ramp;
- the resilient arming means exerting on the arming piece a torque which is greater than that exerted by the resilient triggering means, with locking means, referred to as first locking means, being adapted to immobilise the arming piece against rotation with respect to the first plate, the said first locking means being able to be made inoperative under the action of a trigger member responsive to the state of wear in the friction liners.

By virtue of this arrangement, the arming piece is armed while the clutch is in its engaged position with worn liners, and clearance due to wear is then taken up through a predetermined angle by the loose coupling means during the operation of disengaging the clutch.

In the case of a diaphragm clutch, the accumulation of energy in the latter is used for arming the system, the clutch being engaged. Singular points are thus avoided, as the device for taking up clearance acts continuously in accordance with a predetermined angle. The operation of taking up clearance is therefore initiated in the engaged position of the clutch.

The second resilient means are so chosen as to overcome the action of the first resilient means. They accordingly exert a greater torque on the arming piece, their force being for example greater than that of the first resilient means.

A clutch equipped in this way operates well, on condition of course that the arming piece is immobilised against rotation with respect to the first plate during the operation of taking up clearance.

An object of the present invention is to propose a clutch with a device for taking up clearance, in which this condition is fully satisfied.

Thus, in accordance with the invention, a clutch of the type described above is characterised by the fact that the device for taking up wear further includes second locking means which are adapted to immobilise the said adjusting ramp against rotation with respect to the first plate, the said second locking means being able to be made inoperative under the action of the said trigger member, which is so arranged that the first locking means and second locking means are put into operation in succession during successive operations of disengaging and engaging the clutch.

Preferably, during the first disengaging operation, the first locking means are maintained operational, while the second locking means release the adjusting ramp with respect to the first plate.

Preferably, the first locking means and/or the second locking means consist of a brake; in another version, the first locking means and/or the second locking means consist of an elastic tongue, the end of which is applied against a surface of the arming piece or against a surface of the adjusting ramp which is formed, essentially, with projecting elements with which the said end cooperates.

The engagement ramp is preferably carried by the inner half plate.

The adjusting ramp is preferably carried by the outer half plate.

In a preferred embodiment, the first plate is the pressure plate.

Preferably, the first locking means and the second locking means are operational simultaneously in the initial state in which the clutch is engaged, the friction liners being in the new state.

Further features and advantages of the invention will appear more clearly from the following description by way of example, with reference to the attached drawings, in which.

Figure 1:
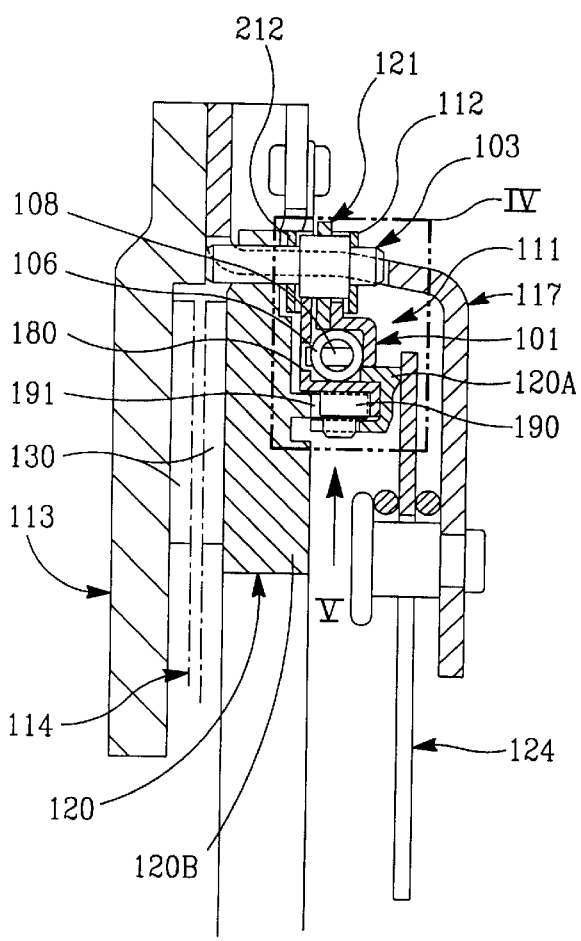
FIG. 1 is a view in axial cross section of a clutch having a device for taking up clearances which are due mainly to wear in the liners, according to the invention.
Figure 4:
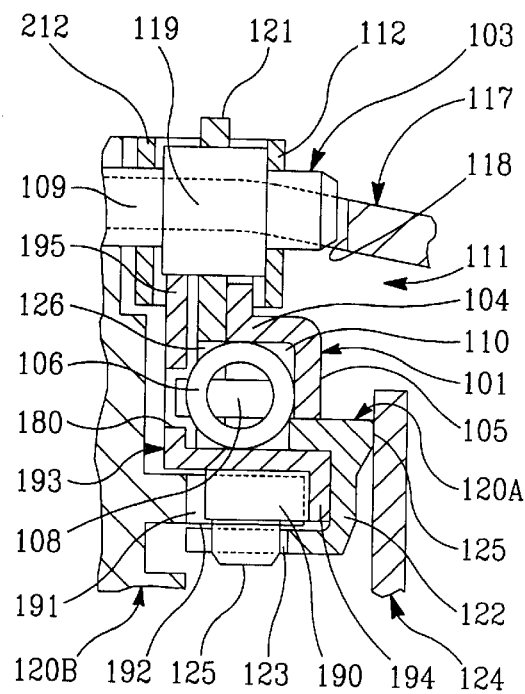
FIG. 4 is a view on an enlarged scale of the portion within the box IV in FIG. 1.
Figure 5:
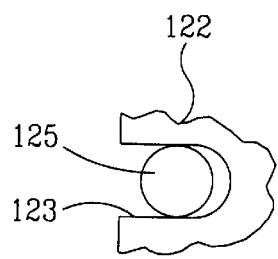
FIG. 5 is a partial view in the direction of the arrow V in FIG. 1.
Figure 6:
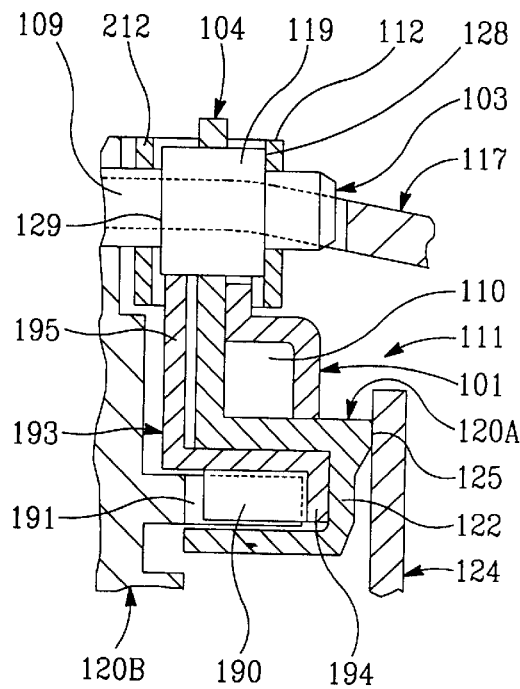
FIG. 6 is similar to FIG. 4, but with a cross section taken on a different plane.

With reference to the drawings, it can be seen that the clutch comprises a reaction plate 113, which is adapted to be mounted on a driving shaft for rotation with it, a friction disc 114 carrying friction liners 130 at its outer periphery and adapted to be mounted on a driven shaft for rotation with the latter.

A cover plate 117 is fixed on the reaction plate 113, and axially acting resilient means, which in this example comprise a diaphragm 124, act between the cover plate 117 and a pressure plate 120 which is fixed to the cover plate 117 for rotation with the latter, but which is able to be displaced axially with respect to it, with the diaphragm 124 bearing on the cover plate 117 so as to apply the pressure plate 120 against the friction disc 114, so that the friction liners 130 are gripped between the pressure plate 120 and the reaction plate 113.

The pressure plate 120 consists of two half plates, namely a half plate 120A referred to as the outer half plate, and a half plate 120B referred to as the inner half plate, which faces the friction disc 114 directly.

The two half plates 120A, 120B are fixed to the driving shaft for rotation with the latter, but are displaceable axially with respect to each other under the action of a device 111 for taking up clearance due to wear.

The clearance take-up device 111 comprises pairs of complementary ramps 190, 191 which are disposed circumferentially and which are associated, respectively, with each of the two half plates 120A, 120B.

One of the ramps, namely the ramp 191 which is referred to as the application ramp, is formed on the circumferential edge of a skirt 192 which extends axially and which is carried by the inner half plate 120B; the other ramp, namely the ramp 190 which is referred to as the adjusting ramp, is carried by an adjusting piece 193, which is made of sheet metal and which is obtained, in the example shown, in the form of press-formed portions having a working face which is complementary, or conjugate, to that of the application ramp 191, these press-formed portions being formed on the inside of a crown portion 194 having an L-shaped cross section and carried by a radial plate portion 195 which is rotatable with respect to the inner half plate 120B. The adjusting piece 193 is held in position for example by tangential tongues, which conventionally couple the inner half plate 120B to the cover plate 117; in a manner known per se, hooks may be associated with these tongues, and tongues other than the above mentioned tongues may of course be used.

In the example shown, the outer half plate 120A comprises an annular disc having a radial plate portion 121 which extends parallel to, and in the vicinity of, the radial plate portion 195 of the adjusting piece 193, and supporting at its inner periphery an annular shroud portion 122 having a U-shaped cross section, the wing portions of which are parallel to the axis of the clutch; the shroud portion 122 surrounds the crown portion 194 of the adjusting piece 193 and the skirt 192 of the inner half plate 120B; the cylindrical wall of the shroud portion 122, which corresponds to the wing portion of the U that is the closer to the axis of the clutch, has at least one axial slot 123 which receives a radial pin 125 carried by the skirt 192, so as to constitute a coupling of the tenon and mortice type. Thus, the half plates 120A, 120B are fixed together for rotation together but are displaceable axially in relation to each other.

The annular shroud portion 122 of the half plate 120A carries an external, annular abutment bead 125, which may be continuous or of divided form, for engagement of the diaphragm 124 thereon.

An arming piece 101, which has a general form of the same kind as that of the adjusting piece 193, with a radial plate portion 104 and a crown portion 105 with an L-shaped cross section, the crown portion 105 extending over a radius larger than that over which the crown portion 194 of the adjusting piece 193 extends, is positioned in such a way that its radial plate portion 104 extends along the radial plate portion 121 of the outer half plate 120A, the radial wing portion of the L-shaped crown portion 105 being radially aligned with the shroud portion 122 of the said outer half plate 120A.

Figure 3:
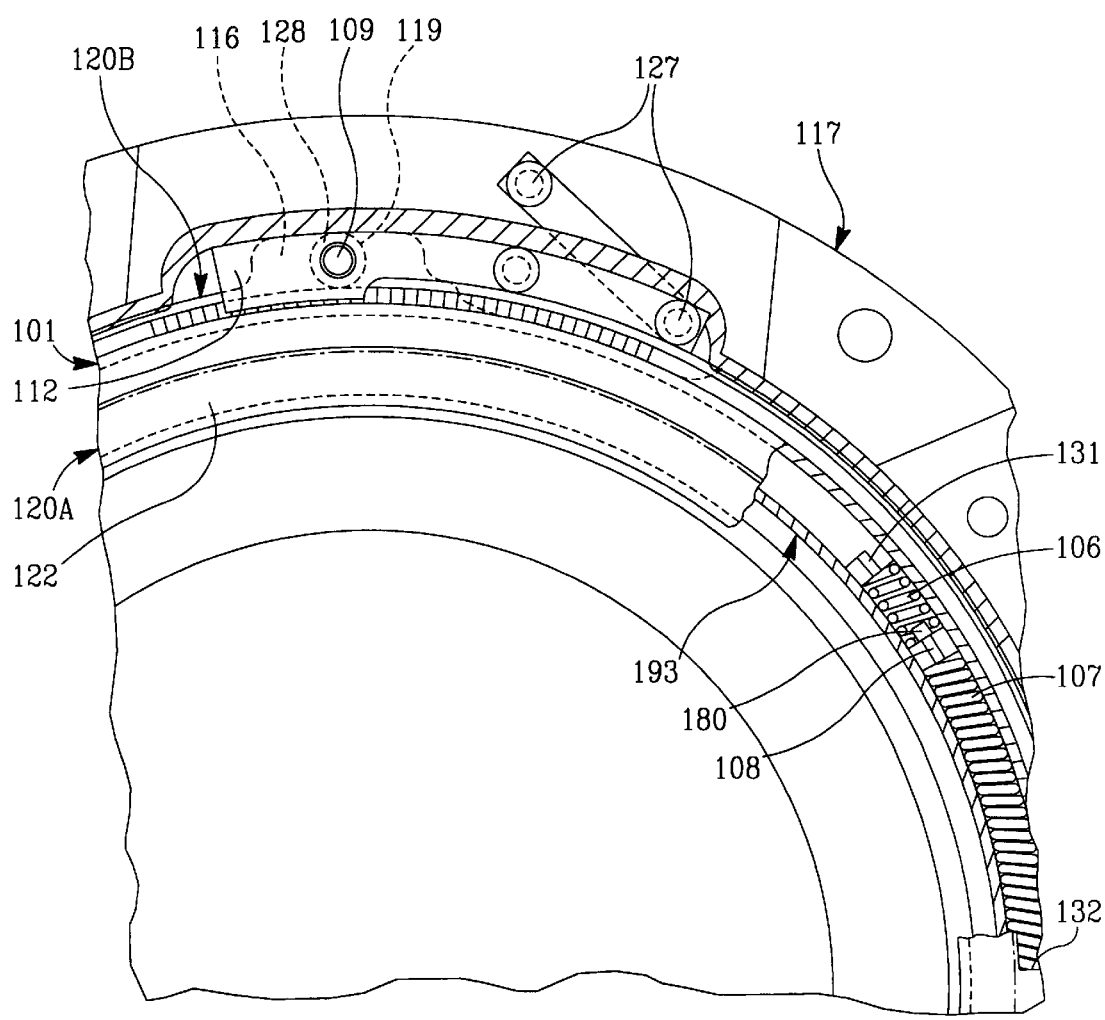
FIG. 3 is a partial view in cross section through a plane at right angles to the axis of the clutch of FIGS. 1 and 2.

The adjusting piece 193 and the arming piece 101 together define an annular space 110, in which are located the resilient triggering means 106 and arming means 107 which can be seen in FIG. 3, and which in this example consist of helical springs; these springs 106 and 107 are disposed cirumferentially on either side of a lug 108 which extends radially and which is parallel to the axis of the clutch, the lug 108 being carried by the arming piece 101 and the springs 106 and 107 being in engagement on the said lug 108. More precisely, the springs 106 and 107 overlap the annular space 110 described above, extending axially also into an aperture 126 which is formed in the outer half plate 120A in the zone in which its radial plate portion 121 and its shroud portion 122 join each other.

The triggering spring 106 is arranged so as to cooperate, through that one of its ends which is not the end on the same side as the lug 108, with a lug 131 of the adjusting piece 193; the arming spring 107 is arranged to cooperate, through that one of its ends which is not the one that lies on the same side as the lug 108, with one of the edges 132 of the aperture 126 in the outer half plate 120A. The lug 108 of the arming piece 101 extends axially, beyond the aperture 126 in the outer half plates 120A, inside a passage 180 which extends circumferentially in the radial plate portion 195 of the adjusting piece 193. Thus, the arming piece 101 is able to turn with respect to the adjusting ramp 190, through a predetermined angle which is defined by the possible relative displacement of the lug 108 in the passage 180, with the lug 108 and the passage 180 constituting loose coupling means between the arming piece 101 and the adjusting ramp 190. The clearance defined by the loose coupling means enables the arming piece to turn between two positions, namely one position corresponding to the friction liners 130 being in their new state, and the other position corresponding to a sufficient state of wear of the friction liners 130, the clutch being in its engaged position. In both of these cases, the arming spring 107 biasses the arming piece 101 towards this other position corresponding to a state of wear in the liners, the arming spring 107 exerting on the arming piece 101 a torque greater than that which is exerted by the triggering spring 106.

Figure 2:
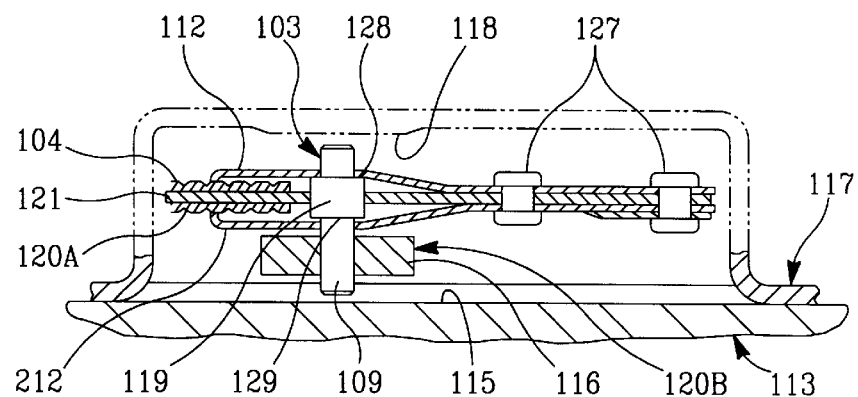
FIG. 2 is a partial view in cross section through a plane passing through the axis of the clutch of FIG. 1.

First locking means 112 are adapted to immobilise the arming piece 101 against rotation with respect to the half plates 120A, 120B; these first locking means 112 consist of a resilient tongue carried by the radial plate portion 121 of the outer half plate 120A at the periphery of the latter, to which it is secured by rivets 127, see FIG. 2; the free end of the tongue 112, which is preferably slightly curved, is adapted to cooperate with the facing surface of the radial plate portion 104 of the arming piece 101; for preference, the said surface facing the radial plate portion 104 is provided with indentations as can be seen in FIG. 2. It will be noted that, here, the half plate 120A is joined to the cover plate 117 by means of tongues, one of which can be seen in FIG. 3 without a reference numeral, being secured by one of the rivets 127.

The tongue 112 may or may not cooperate with the said surface facing towards the radial plate portion 104, under the action of a trigger member 103 which is sensitive to the state of wear in the friction liners 130.

More precisely, the trigger member 103 consists of a rod 109 which lies parallel to the axis of the clutch and which has a portion 119, the diameter of which is larger than that of the remainder of the rod, so that transverse annular surfaces 128, 129 are defined on either side of the portion 119.

The rod 109 of the trigger member 103 is mounted frictionally in a passage extending through a radial lug 116 of the inner half plate 120B; each of the ends of the rod 109 is located in line with, respectively, a transverse abutment surface 118 of the cover plate 117 and a transverse abutment surface 115 of the reaction plate 113; the axial distance between the abutment surfaces 115 and 118 is greater than the length of the rod 109, by an amount which corresponds to the course of travel in the disengagement or engagement of the radial lug 116 when the friction liners 130 are new.

One end of the rod 109 extends through the tongue 112 with a slight clearance, so that the tongue is adapted to cooperate with the annular surface 128 of the trigger member 103, which, under the conditions described below, tends to lift the tongue 112 with respect to the radial plate portion 121 of the outer half plate 120A, which thereafter no longer cooperates with the radial plate portion 104 of the arming piece 101, so that the latter is now released.

Second locking means 212 are adapted to immobilise the adjusting piece 193 against rotation with respect to the half plates 120A, 120B; these second locking means 212 again consist of an elastic tongue, similar to the tongue 112 and carried by the radial plate portion 121 of the outer half plate 120A at the periphery of the latter and on the face of the latter which is opposite to the one that carries the tongue 112, with the rivets 127 retaining the two tongues 112 and 212 in place; the other end of the rod 109 extends with a slight clearance through the tongue 212, the portion 119, having the enlarged diameter, of the trigger member 103 being disposed axially between the two tongues 112 and 212, so that the tongue 212 is adapted to cooperate with the annular surface 129 of the trigger member 103, which, when a relative displacement in the opposite direction to the displacement that lifts the tongue 112, as described above, occurs, tends to lift the tongue 212 with respect to the radial plate portion 121, so that from then on, the latter no longer cooperates with the radial plate portion 195 of the adjusting piece 193, so that the latter is now free.

Operation takes place as follows, with reference to the diagrammatic representations in FIGS. 7 to 10.

Figure 7:
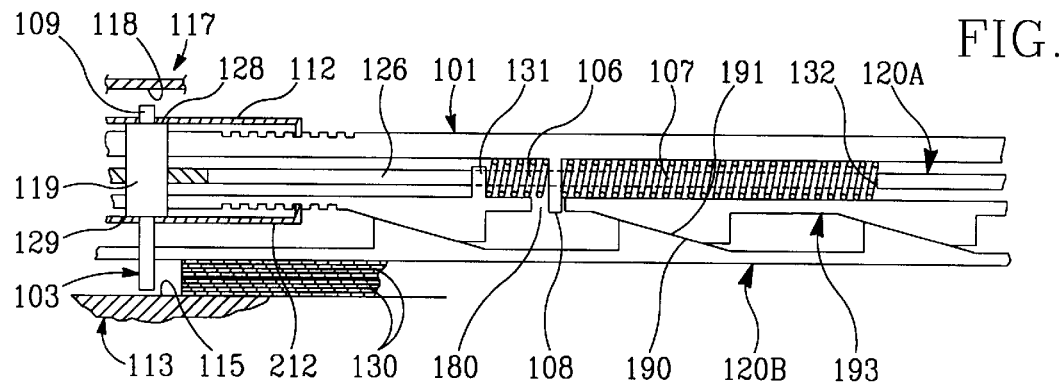
FIGS. 7 to 10 are diagrams illustrating the operation of the clutch of FIGS. 1 to 6, and in particular that of its device for taking up clearances due to wear in the liners.

In FIG. 7, the various elements are represented in the position which they occupy initially, the clutch being engaged and the liners 130 being new; the locking means, namely the tongues 112 and 212, immobilise the arming piece 101 and the adjusting piece 193, the axial length of the portion 119 of enlarged diameter of the trigger member 103 being so arranged that this is so, the tongues 112 and 212 being in contact with the annular surfaces 128, 129 respectively of the trigger member 103; this position corresponds in fact to the position in which the preassembled and packaged clutch is stored under prestress, with the friction disc being centred and the diaphragm held in the engaged position, with the locking means preventing any risk of accidental closing of clearances; it will be understood that, when the clutch is installed, the tongue 212 does not in practice truly immobilise the adjusting piece 193, which has already been immobilised because, since the clutch is in its engaged condition, the outer half plate 120A, the adjusting piece 193 and the inner half plate 120B are gripped axially and are therefore immobile, that is to say they are secured together in rotation. The arming spring 107 is compressed and the triggering spring 106 is relaxed; the lug 108 of the arming piece 101 cooperates with the right hand edge, with respect to FIG. 8, of the passage 180 in the adjusting piece 193; the total axial length of the rod 109 of the trigger member 103 is, as has already been stated above, shorter than the axial spacing between the abutment surfaces 115 and 118 of the reaction plate 113 and cover plate 117 respectively, with which its ends are adapted to cooperate.

When the ends of the fingers of the diaphragm 124 are acted on in order to disengage the clutch, the assembly that consists of the outer half plate 120A, the arming piece 101, the adjusting piece 193 and the inner half plates 120B moves away from the friction liners 130 and towards the cover plate 117; this movement away is obtained in the usual way by virtue of the tangential tongues which support and couple, in rotation but with axial mobility, the pressure plate 120 with respect to the cover plate 117; return hook elements, attaching the outer peripheral edge of the diaphragm 124 and the outer half plate 120A together, may also be provided. In this movement, the inner half plate 120B drives the trigger member 103 until its rod 109 enters into contact with the abutment surface 118 of the cover plate 117; as the movement continues, the above mentioned assembly is displaced with respect to the trigger member 103: the tongue 112 leaves the annular surface 128 of the trigger member 103 and continues to immobilise the arming piece 101; the tongue 212 is retained by the annular surface 129 of the trigger member 103, and the adjusting piece 193 is released. In this position, which is shown in FIG. 8, the arming spring 107 is unable to displace the arming piece 103, which is immobilised by the tongue 112, and the triggering spring 106 does not act on the adjusting piece 193, which is retained by the lug 108 on which the right hand edge of its aperture 180 bears, the lug 108 being immobilised by the tongue 112.

Figure 8:
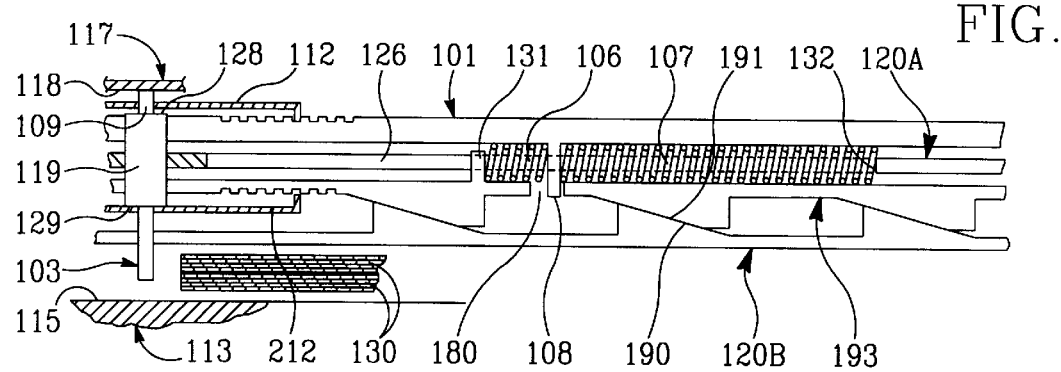

If the liners 130 have not become worn, the assembly would be displaced as a unit into the position of FIGS. 7 and 8 successively when the clutch is successively engaged and disengaged.

Figure 9:
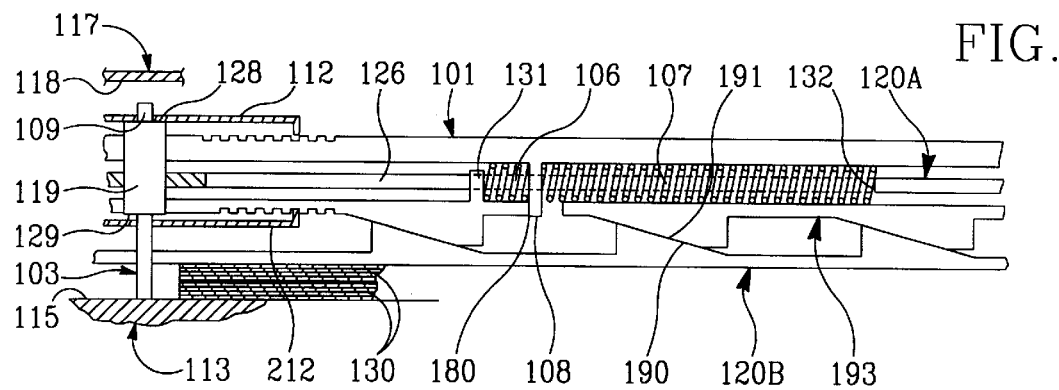
Figure 10:
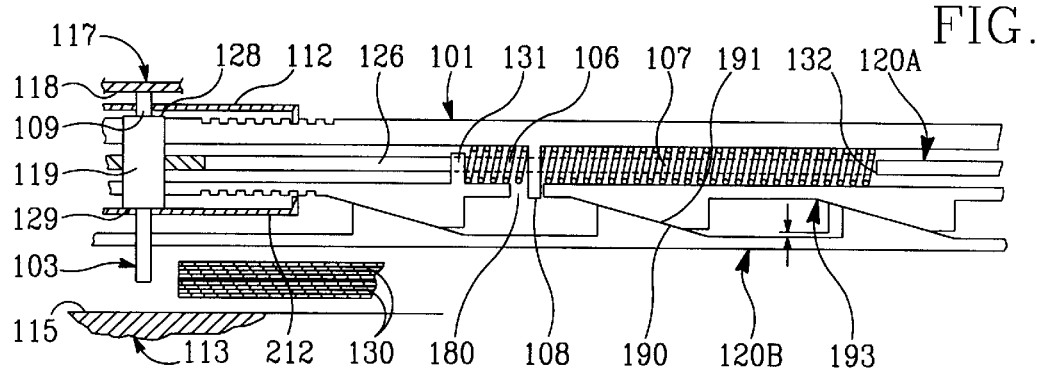

When the liners 130 are worn, and as is shown in FIG. 9, in the engaged position of the clutch the inner half plate 120B is of course brought closer to the reaction plate 113 with respect to its position shown in FIG. 7; in this approaching movement, the lug 116 of the pressure plate 120B has slid on the rod 109 of the trigger member 103 retained by the reaction plate 113, its end having come into contact with the abutment surface 115 before the inner half plate 120B has made contact with the worn liners 130; during this movement of the assembly towards the reaction plate 113, the tongue 112, retained by its annular surface 128, releases the arming piece 101, while the tongue 212, which is driven by the assembly that has been displaced, leaves the annular surface 129 but continues to immobilise the adjusting piece 193; the arming piece 101 having been released, the arming spring 107 displaces it, compressing the triggering spring 106 until it comes into abutment through its lug 108 on the left hand edge, with reference to the drawings, of the passage 180 in the adjusting piece 193 which is immobilised by the tongue 212; this is the position shown in FIG. 9.

During the next following operation of clutch disengagement, the assembly is displaced towards the cover plate 117 and, as has been described with reference to FIG. 8, the tongue 112 remains active while the tongue 212 becomes inactive; the adjusting piece 193 is then displaced by the triggering spring 106 until the right hand edge of its aperture 180 comes into abutment against the lug 108 which is immobilised by the tongue 112; the ramps 190 and 191 are so inclined that, during this displacement of the adjusting piece 193, from right to left with respect to FIGS. 7 to 10, the adjusting piece 193 increases the thickness of the pressure plate 120, bringing the inner half plate 120B closer to the friction liners 130, which at least partly compensates for their wear.

Thanks to the invention, during the disengagement of the clutch, the adjusting ramp 190 is movable in rotation under the action of the spring 106 in the event of wear in the friction liners 130, apart from smaller amounts of wear in the friction surfaces of the reaction plate 113 and pressure plate 120B within the limits of the loose coupling means 108, 180, the arming piece 101 being locked with total certainty.

The tongue 212 is only locked after locking of the tongue 112; this tongue 212 first locks the arming piece 101 so that the tongue 112 has time to lock the arming piece 101.

The number of tongues 112, 212 does of course depend on the application.

We claim:

1. A friction clutch, especially for a motor vehicle, of the kind comprising:

a reaction plate (113) adapted to be mounted on a driving shaft for rotation with the latter;

a friction disc (114) carrying friction liners (130) at its outer periphery and adapted to be mounted on a driven shaft for rotation with the latter;

a pressure plate (120);

a cover plate (117) fixed on the reaction plate (113), axially acting resilient means (124) acting between the cover plate (117) and the pressure plate (120), the pressure plate (120) being rotatable with the cover plate (117) while being displaceable axially with respect thereto;

a first plate, which is one of the two plates comprising the reaction plate (113) and pressure plate (120), consisting of two half plates, namely an outer half plate (120A) and an inner half plate (120B), the inner half plate (120B) being the one which faces towards a friction liner (130) and which is adapted to cooperate with the latter;

the two half plates (120A, 120B) being rotatable with the driving shaft but being displaceable axially with respect to each other under the action of a device (111) for taking up clearance due to wear;

which device (111) for taking up clearance comprises at least one pair of complementary ramps (190, 191) which are disposed circumferentially and each of which is associated with a respective one of the two half plates (120A, 120B), one of the ramps (191), namely an application ramp, being fixed to one (120B) of the half plates for rotation therewith, the other ramp (190), namely an adjusting ramp, being adapted to be displaced circumferentially with respect to the engagement ramp (191) and therefore with respect to both half plates (120A, 120B);

an arming piece (101) which is mounted for rotation with respect to the said adjusting ramp (190) through a predetermined angle which is defined by loose coupling means (108, 180), between two positions, one of which corresponds to the new state of the friction liners (130), the other one corresponding to a state of wear in the friction liners (130), with circumferentially acting resilient arming means (107) biassing the arming piece (101) towards the said other position, and with circumferentially acting resilient triggering means (106) being disposed between the arming piece (101) and the adjusting ramp (190);

the resilient arming means (107) exerting on the arming piece (101) a torque which is greater than that exerted by the resilient triggering means (106), with locking means (112), referred to as first locking means, being adapted to immobilise the arming piece (101) against rotation with respect to the first plate, the said first locking means (112) being able to be made inoperative under the action of a trigger member (103) responsive to the state of wear in the friction liners (130), characterised by the fact that the device (111) for taking up wear further includes second locking means (212) which are adapted to immobilise the said adjusting ramp (190) against rotation with respect to the first plate, the said second locking means (212) being able to be made inoperative under the action of the said trigger member (103), which is so arranged that the first locking means (112) and second locking means (212) are put into operation in succession during successive operations of disengaging and engaging the clutch.

2. A clutch according to claim 1, characterised by the fact that, during the first disengaging operation, the first locking means (112) are maintained operational, while the second locking means (212) release the adjusting ramp (190) with respect to the first plate.

3. A clutch according to claim 2, characterised by the fact that the first locking means (112) and/or the second locking means (212) consist of a brake.

4. A clutch according to claim 2, characterised by the fact that the first locking means (112) and/or the second locking means (212) consist of an elastic tongue, the end of which is applied against a surface of the arming piece (101), or against a surface of the adjusting ramp (190) formed with projecting elements with which the said end cooperates.

5. A clutch according to claim 1, characterised by the fact that the engagement ramp (191) is carried by the inner half plate (120B).

6. A clutch according to claim 1, characterised by the fact that the adjusting ramp (190) is carried by the outer half plate (120A).

7. A clutch according to claim 1, characterised by the fact that the first plate is the pressure plate (120).

8. A clutch according to claim 1, characterised by the fact that the first locking means (112) and the second locking means (212) are operational simultaneously in the initial state in which the clutch is engaged, the friction liners (130) being in the new state.

* * * * *